(12) United States Patent
Soga

(10) Patent No.: US 11,383,190 B2
(45) Date of Patent: Jul. 12, 2022

(54) CERAMIC HONEYCOMB FILTER

(71) Applicant: HITACHI METALS, LTD., Tokyo (JP)

(72) Inventor: Wataru Soga, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 76 days.

(21) Appl. No.: 16/960,802

(22) PCT Filed: Mar. 29, 2019

(86) PCT No.: PCT/JP2019/014345
§ 371 (c)(1),
(2) Date: Jul. 8, 2020

(87) PCT Pub. No.: WO2019/189889
PCT Pub. Date: Oct. 3, 2019

(65) Prior Publication Data
US 2021/0060466 A1    Mar. 4, 2021

(30) Foreign Application Priority Data
Mar. 29, 2018   (JP) .............................. JP2018-064784

(51) Int. Cl.
*B01D 39/20*    (2006.01)
*B01D 46/24*    (2006.01)
*F01N 3/022*    (2006.01)

(52) U.S. Cl.
CPC ..... *B01D 39/2075* (2013.01); *B01D 46/2418* (2013.01); *F01N 3/022* (2013.01)

(58) Field of Classification Search
None
See application file for complete search history.

(56) References Cited

U.S. PATENT DOCUMENTS

2002/0004445 A1    1/2002  Beall et al.
2006/0251909 A1*  11/2006  Beall ................... B32B 3/12
                                                    428/454
(Continued)

FOREIGN PATENT DOCUMENTS

JP       S5594976 A  *  1/1980
JP    2003-534229 A      11/2003
(Continued)

OTHER PUBLICATIONS

International Search Report for PCT/JP2019/014345 dated May 14, 2019 [PCT/ISA/210].

*Primary Examiner* — Mary I Omori
(74) *Attorney, Agent, or Firm* — Sughrue Mion, PLLC

(57) ABSTRACT

A ceramic honeycomb filter comprising a cordierite-type ceramic honeycomb structure having large numbers of flow paths partitioned by porous cell walls, and plugs formed in end portions of predetermined flow paths of the ceramic honeycomb structure; the cell walls having a thermal expansion coefficient Tw ($\times 10^{-7}$/° C.) of 10 or less in the flow path direction between 40° C. and 800° C.; the plugs comprising at least ceramic particles, and 5-25 parts by mass of an amorphous oxide matrix per 100 parts by mass of the ceramic particles; the ceramic particles comprising at least 42-90% by mass of amorphous silica particles, and 10-58% by mass of cordierite particles; and the amorphous silica particles comprising 4-30% by mass of first silica particles having a median particle diameter of 10-40 μm, and 70-96% by mass of second silica particles having a median particle diameter of 70-200 μm.

5 Claims, 3 Drawing Sheets

(56) References Cited

U.S. PATENT DOCUMENTS

| | | |
|---|---|---|
| 2007/0039298 A1 | 2/2007 | Tokumaru |
| 2016/0250577 A1 | 9/2016 | Okazaki |
| 2017/0037760 A1 | 2/2017 | Okazaki |
| 2017/0298794 A1 | 10/2017 | Okazaki |
| 2017/0313628 A1 | 11/2017 | Noguchi et al. |
| 2018/0016955 A1 | 1/2018 | Okazaki |
| 2018/0134630 A1 | 5/2018 | Noguchi et al. |

FOREIGN PATENT DOCUMENTS

| | | |
|---|---|---|
| JP | 2005-125318 A | 5/2005 |
| WO | 2015/046242 A1 | 4/2015 |
| WO | 2016/052682 A1 | 4/2016 |
| WO | 2016/152709 A1 | 9/2016 |

* cited by examiner

CERAMIC HONEYCOMB FILTER

CROSS REFERENCE TO RELATED APPLICATIONS

This application is a National Stage of International Application No. PCT/JP2019/014345 filed Mar. 29, 2019, claiming priority based on Japanese Patent Application No. 2018-064784 filed Mar. 29, 2018.

FIELD OF THE INVENTION

The present invention relates to a ceramic honeycomb filter having plugs in end portions of predetermined flow paths of a ceramic honeycomb structure.

BACKGROUND OF THE INVENTION

To remove particulate matter from an exhaust gas discharged from diesel engines, as shown in FIG. 1, a particulate matter-capturing ceramic honeycomb filter (hereinafter simply called "honeycomb filter") 10 having a structure, which comprises a ceramic honeycomb structure 11 having large numbers of flow paths 15a, 15b partitioned by porous ceramic cell walls 14 for capturing the particulate matter in the exhaust gas by the cell walls 14, is practically used. This honeycomb filter 10 has plugs 13a, 13b formed by a plugging material alternately on the exhaust gas inlet-side and outlet-side end surfaces 12a, 12b of the flow paths 15a, 15b surrounded by the cell walls 14. Accordingly, an exhaust gas flowing into the flow paths 15b from the inlet-side end surface 12a passes through the cell walls 14 and the flow paths 15a, and exits from the outlet-side end surface 12b. While the exhaust gas passes through the cell walls 14, particulate matter in the exhaust gas is captured by the cell walls 14, so that particulate matter is removed from the exhaust gas.

The performance required for the honeycomb filter includes low pressure loss, high particulate matter-capturing efficiency, etc. Because the accumulation of the captured particulate matter in the honeycomb filter clogs cell wall pores, resulting in high pressure loss, the accumulated particulate matter should be removed by burning to regenerate the honeycomb filter. Therefore, the honeycomb filter should be able to withstand a use environment in which it is repeatedly exposed to high temperatures when the accumulated particulate matter is burned. Namely, it should have high heat resistance and thermal shock resistance. Accordingly, cordierite has conventionally been used as ceramics forming the cell walls.

The applicant disclosed by JP 2005-125318 A a ceramic honeycomb filter comprising plugs formed in predetermined flow paths of a sintered ceramic honeycomb made of a material comprising cordierite as a main crystal for removing particulate matter from an exhaust gas passing through porous cell walls partitioning the flow paths, part of the plugs being composed of at least ceramic particles, and an amorphous oxide matrix formed by colloidal oxide, which exists between the ceramic particles. This ceramic honeycomb filter is produced by charging a plugging material comprising at least ceramic particles and colloidal oxide into predetermined flow paths of the sintered ceramic honeycomb, and fixing the plugging material to the sintered ceramic honeycomb at a temperature of 1000° C. or lower. Because this invention can reduce the difference in a thermal expansion coefficient between the ceramic honeycomb structure and the plugs, and lower the fixing temperature by using the amorphous oxide matrix made of colloidal oxide, residual stress unlikely remains in the resultant ceramic honeycomb filter, thereby providing a ceramic honeycomb filter having excellent thermal shock resistance. JP 2005-125318 A describes that in Examples, ceramic honeycomb filters having excellent plug strength and thermal shock resistance were obtained by using molten silica or cordierite as ceramic particles.

The applicant also disclosed by WO 2016/052682 A a method for producing a ceramic honeycomb filter comprising a ceramic honeycomb structure having large numbers of flow paths surrounded by porous cell walls made of a material comprising cordierite as a main crystal, and plugs formed in predetermined flow paths of the ceramic honeycomb structure; the plugs being formed by charging a plugging material comprising at least 100 parts by mass of ceramic particles, 5-20 parts by mass on a solid basis of colloidal oxide, and 1.5-4 parts by mass of an organic binder into predetermined flow paths of the ceramic honeycomb structure, and drying the plugging material by microwave or high-frequency induction heating; the ceramic particles having a particle size distribution having at least a first peak and a second peak lower than the first peak; and the first peak being in a particle size range of 100-200 μm, and the second peak being in a particle size range of 10-30 μm. The method of this invention provides a ceramic honeycomb filter having good bonding strength of the plugs to the cell walls even when the plugs are fixed at low temperatures. WO 2016/052682 A describes that in Examples, ceramic honeycomb filters having excellent bonding strength of plugs to cell walls, soot-capturing performance and thermal shock resistance were obtained by using the first and second ceramic particles of cordierite.

To meet recent stricter exhaust gas regulations, investigation is under way to provide an exhaust gas-cleaning apparatus comprising both NOx-removing SCR apparatus and particulate matter-removing honeycomb filter. To this end, the honeycomb filters are required to have higher pressure loss characteristics and capturing ratios of particulate matter having particle sizes of 50 nm or less (so-called nano-particles) in exhaust gases than ever. Thus, investigation is conducted to improve the cell walls of ceramic honeycomb structures. The applicant also discloses in WO 2016/152709 A a ceramic honeycomb structure comprising cell walls having a particular pore diameter distribution for effectively capturing nano-sized PM (particulate matter) having large influence on the number of particles in an exhaust gas, even in an initial stage of use before PM is accumulated (starting the use of an unused ceramic honeycomb filter, or the reuse of a regenerated ceramic honeycomb filter).

However, when the plugs disclosed in JP 2005-125318 A and WO 2016/052682 A are used in the ceramic honeycomb structure described in WO 2016/152709 A, cracks 31 are likely generated at cell wall interconnections between plugs of the ceramic honeycomb filter 10 when thermal shock is applied during the regeneration of the filter, etc. as shown in FIG. 3, exhibiting insufficient thermal shock resistance. When cracking occurs at cell wall interconnections between plugs, PM, particularly nano-sized PM, is not captured, so that it is discharged from the ceramic honeycomb filter, resulting in a low PM-capturing ratio. This likely fails to meet the regulations of the number of PM particles, which will be enacted in the near future.

Further, ceramic honeycomb filters produced by the methods described in JP 2005-125318 A and WO 2016/052682 A likely have uneven plug length. The plug length is the length of a plug in a longitudinal direction of the ceramic honeycomb filter. It is considered that because the plugs are formed by charging a plugging material slurry or paste comprising ceramic particles, colloidal oxide, etc. into end portions of predetermined flow paths, the unevenness of filling length, the shrinkage of the plugging material heated to evaporate a liquid component, etc. occur, resulting in uneven plug length. The uneven plug length leads to uneven effective area of cell walls acting as a filter, a longer plug length providing a smaller cell wall area, resulting in increased pressure loss when used for a filter for capturing particulate matter.

OBJECT OF THE INVENTION

Accordingly, an object of the present invention is to provide a ceramic honeycomb filter capable of effectively capturing nano-sized PM having large influence on the number of particles in an exhaust gas, which is unlikely cracked at cell wall interconnections between plugs even when thermal shock is applied in the regeneration of the filter by burning PM captured by the cell walls, and which has good bonding strength of the plugs to the cell walls and uniform plug length.

SUMMARY OF THE INVENTION

In view of the above object, the inventor has conducted intensive investigation on the cause of cracks generated by thermal shock at cell wall interconnections between plugs, in a ceramic honeycomb filter comprising a ceramic honeycomb structure having large numbers of flow paths partitioned by porous cell walls, and plugs formed in end portions of predetermined flow paths of the ceramic honeycomb structure, when the ceramic honeycomb filter is regenerated by burning PM captured by its cell walls. As a result, the inventor has found that by optimizing a plugging material depending on the thermal expansion coefficient of the cell walls of the ceramic honeycomb structure, this problem can be solved. The present invention has been completed based on such finding.

Thus, the ceramic honeycomb filter of the present invention comprises a cordierite-type ceramic honeycomb structure having large numbers of flow paths partitioned by porous cell walls, and plugs formed in end portions of predetermined flow paths of the ceramic honeycomb structure;

the cell walls having a thermal expansion coefficient Tw ($\times 10^{-7}$/° C.) of 10 or less in the flow path direction between 40° C. and 800° C.;

the plugs comprising at least ceramic particles, and 5-25 parts by mass of an amorphous oxide matrix per 100 parts by mass of the ceramic particles;

the ceramic particles comprising at least 42-90% by mass of amorphous silica particles, and 10-58% by mass of cordierite particles; and the amorphous silica particles comprising 4-30% by mass of first silica particles having a median particle diameter of 10-40 μm, and 70-96% by mass of second silica particles having a median particle diameter of 70-200 μm.

The amount X (% by mass) of amorphous silica particles in the ceramic particles and the thermal expansion coefficient Tw ($\times 10^{-7}$/° C.) of the cell walls between 40° C. and 800° C. preferably meet $$(118.33 - 8.1367 \times Tw) \leq X \leq (150.88 - 8.1367 \times Tw).$$

The cordierite particles preferably have a median particle diameter of 5-30 μm.

The amorphous silica particles preferably comprise 5-25% by mass of the first silica particles, and 75-95% by mass of the second silica particles.

The amorphous oxide matrix is preferably silica.

Effects of the Invention

The present invention can provide a ceramic honeycomb filter unlikely suffering cracking at cell wall interconnections between plugs under thermal shock during the regeneration of the filter, etc., and having good bonding strength of plugs to cell walls and uniform plug length.

BRIEF DESCRIPTION OF THE DRAWINGS

FIG. 1(*b*) is a cross-sectional view longitudinally showing an example of the ceramic honeycomb filters of the present invention.

FIG. 2(*b*) is a schematic view showing another step of forming plugs of the ceramic honeycomb filter of the present invention.

FIG. 2(*c*) is a schematic view showing a further step of forming plugs of the ceramic honeycomb filter of the present invention.

DESCRIPTION OF THE PREFERRED EMBODIMENTS

Figure 1A:
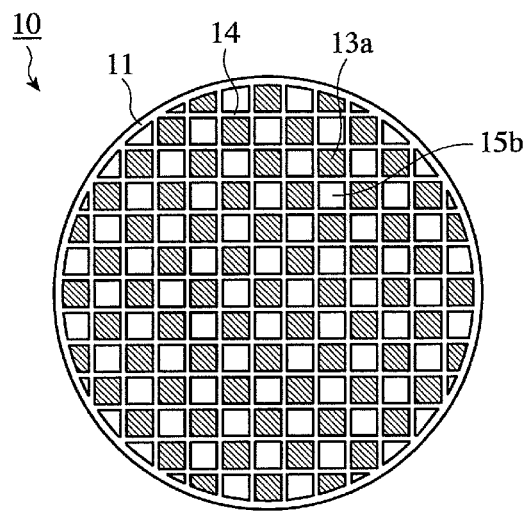
FIG. 1(*a*) is a front view showing an example of the ceramic honeycomb filters of the present invention.
Figure 1B:
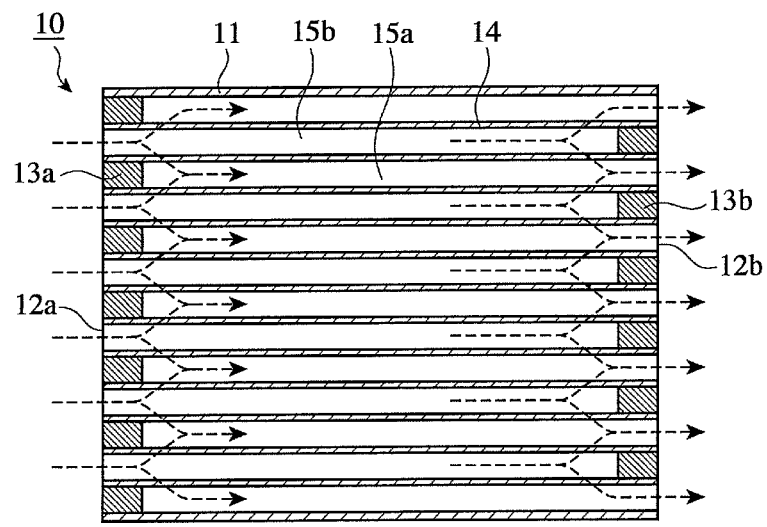

The embodiments of the present invention will be explained specifically below, without intention of restricting the present invention thereto. Proper modifications, improvements, etc. may be made based on usual knowledge of those skilled in the art, within the scope of the present invention.

[1] Ceramic Honeycomb Filter

The ceramic honeycomb filter of the present invention comprises a cordierite-type ceramic honeycomb structure having large numbers of flow paths partitioned by porous cell walls, and plugs formed in end portions of predetermined flow paths of the ceramic honeycomb structure; the cell walls having a thermal expansion coefficient Tw ($\times 10^{-7}$/° C.) of 10 or less in the flow path direction between 40° C. and 800° C.; the plugs comprising at least ceramic particles, and 5-25 parts by mass of an amorphous oxide matrix per 100 parts by mass of the ceramic particles; the ceramic particles comprising at least 42-90% by mass of amorphous silica particles, and 10-58% by mass of cordierite particles; and the amorphous silica particles comprising 4-30% by mass of first silica particles having a median particle diameter of 10-40 μm, and 70-96% by mass of second silica particles having a median particle diameter of 70-200 μm.

Amorphous silica and cordierite are known as low-thermal expansion materials; amorphous silica having a thermal expansion coefficient of $5 \times 10^{-7}$/° C. or less, and cordierite having a thermal expansion coefficient of 16×10$^{-7}$/° C. or less. In the ceramic honeycomb filter of the present invention, amorphous silica particles and cordierite particles are used as ceramic particles constituting the plugs, with their mixing ratio and the ratio of the amorphous oxide matrix for binding the ceramic particles optimized. Accordingly, when a filter undergoes thermal shock in burning PM captured by the cell walls for regeneration, cracking unlikely occurs at interconnections of cell walls between the plugs, with high bonding strength between the plugs and the cell walls and uniform plug length.

[1-1] Cordierite-Type Ceramic Honeycomb Structure (1) Thermal Expansion Coefficient The cordierite-type ceramic honeycomb structure constituting the ceramic honeycomb filter of the present invention comprises cordierite as a main crystal, with their cell walls having a thermal expansion coefficient Tw (x 10$^{-7}$/° C.) of 10 or less in the flow path direction between 40° C. and 800° C. When the thermal expansion coefficient Tw (×10$^{-7}$/° C.) of the cell walls in the flow path direction between 40° C. and 800° C. is more than 10, the honeycomb structure has low thermal shock resistance, failing to withstand practical use as a ceramic honeycomb filter for removing particulate matter from an exhaust gas discharged from diesel engines. The thermal expansion coefficient Tw (x 10$^{-7}$/° C.) of the cell walls in the flow path direction between 40° C. and 800° C. is preferably 9.5 or less, and further preferably 9 or less, and its lower limit is 3 or more, and preferably 3.5 or more.

(2) Pore Diameter Distribution

The cordierite-type ceramic honeycomb structure constituting the ceramic honeycomb filter of the present invention preferably has porosity of 50-60%, a pore diameter d5, at which a cumulative pore volume is 5% of the total pore volume in a pore diameter distribution measured by mercury porosimetry, being 22 μm or more and less than 55 μm, a pore diameter d10 at 10% being 15-35 μm, a median pore diameter d50 being 10-20 μm, a pore diameter d85 at 85% being 5-9 μm, pore diameter d90 at 90% being 3-8 μm, and a pore diameter d98 at 98% being 2.5 μm or less. With such a pore diameter distribution, the ceramic honeycomb structure can effectively capture nano-sized PM having large influence on the number of particles in an exhaust gas.

[1-2] Plugs (1) Ceramic Particles

Ceramic particles constituting the plugs in the ceramic honeycomb filter of the present invention comprise at least 42-90% by mass of amorphous silica particles, and 10-58% by mass of cordierite particles. Namely, the amount X of amorphous silica particles in the ceramic particles is 42-90% by mass.

When the amount X of amorphous silica particles is less than 42% by mass, the plugs have a large thermal expansion coefficient in the flow path direction because of a small amount of amorphous silica particles in the plugs, resulting in too large thermal expansion coefficient difference between the cell walls and the plugs. As a result, cracking occurs by thermal shock at cell wall interconnections between plugs when the filter is regenerated, etc., resulting in low thermal shock resistance. On the other hand, when the amount X of amorphous silica particles is more than 90% by mass, the plugs have a small thermal expansion coefficient because of a large amount of amorphous silica particles in the plugs, providing too large thermal expansion coefficient difference in the flow path direction between the cell walls and the plugs. As a result, cracking occurs by thermal shock at cell wall interconnections between plugs when the filter is regenerated, etc., resulting in low thermal shock resistance.

Further, the amount X (% by mass) of amorphous silica particles in the ceramic particles and the thermal expansion coefficient Tw (×10$^{-7}$/° C.) of the cell walls between 40° C. and 800° C. preferably meet the formula (1) of $$(118.33-8.1367 \times Tw) \leq X \leq (150.88-8.1367 \times Tw).$$

With the amount X of amorphous silica particles in a range meeting the formula (1), the difference between the thermal expansion coefficient of the cell walls in the flow path direction and the thermal expansion coefficient of the plugs is small, surely suppressing cracking by thermal shock at cell wall interconnections between plugs when the filter is regenerated, etc. The lower limit of the amount X (% by mass) of amorphous silica particles is preferably (122.4−8.1367×Tw), and further preferably (126.47−8.1367×Tw). The upper limit of the amount X (% by mass) is preferably (146.81−8.1367×Tw), and further preferably (142.74−8.1367×Tw).

Though the ceramic particles are composed of amorphous silica particles and cordierite particles, 1% or less by mass of ceramic particles (alumina, mullite, etc.) other than amorphous silica particles and cordierite particles may be contained, because 1% or less by mass of other ceramic particles would have small influence on the thermal expansion coefficient of the plugs.

(i) Amorphous Silica Particles

Amorphous silica particles in the ceramic particles constituting the plugs comprise 4-30% by mass of first silica particles having a median particle diameter of 10-40 μm, and 70-96% by mass of second silica particles having a median particle diameter of 70-200 μm. With at least two types of amorphous silica particles having different median particle diameters contained at the above ratios, the shrinkage of a plugging material is suppressed when heat-dried in the step of forming plugs, resulting in less likelihood of unevenness in plug length, and making stronger the plugs obtained by heat-drying the plugging material.

When the second silica particles in the amorphous silica particles are less than 70% by mass (the first silica particles are more than 30% by mass), the plugging material largely shrinks when heat-dried, likely resulting in uneven plug length. On the other hand, when the second silica particles are more than 96% by mass (the first silica particles are less than 4% by mass), the plugs obtained by heat-drying the plugging material are likely to have low strength.

In the amorphous silica particles, the lower limit of the percentage of the second silica particles is preferably 75% by mass, and further preferably 80% by mass (the upper limit of the percentage of the first silica particles is preferably 25% by mass, and further preferably 20% by mass), and the upper limit of the percentage of the second silica particles is preferably 95% by mass, and further preferably 90% by mass (the lower limit of the percentage of the first silica particles is preferably 5% by mass or more, and further preferably 10% by mass or more).

When the first silica particles in the amorphous silica particles have a median particle diameter of less than 10 μm, the plugging material largely shrinks when heated, likely resulting in uneven plug length. On the other hand, when the median particle diameter is more than 40 μm, the plugs obtained by heating the plugging material are likely to have low strength. Preferably, the lower limit is 15 μm or more, and the upper limit is 35 μm or less. In a curve showing the relation between the particle diameters and cumulative volume of the first silica particles, the lower limit of the particle diameter D10 at a cumulative volume corresponding to 10% of the total volume is 1 μm or more, and preferably 5 μm or more, and the upper limit is 20 μm or less, and preferably 15 μm or less. The lower limit of the particle diameter D90 at a cumulative volume corresponding to 90% of the total volume is 30 μm, and preferably 40 μm, and the upper limit is 70 μm, and preferably 55 μm. Incidentally, D10<D50<D90.

When the median particle diameter of the second silica particles is less than 70 μm, the plugging material largely shrinks when heated, likely resulting in uneven plug length. On the other hand, when the median particle diameter is more than 200 μm, the plugs obtained by heating the plugging material are likely to have low strength. Preferably, the lower limit is 80 μm or more, and the upper limit is 180 μm or less. The lower limit of D10 of the second silica particles is 50 μm or more, and preferably 55 μm or more, and the upper limit is 80 μm or less, and preferably 70 μm or less. The lower limit of D90 is 100 μm or more, and preferably 110 μm or more, and the upper limit is 300 μm or less, and preferably 250 μm or less. Incidentally, D10<D50<D90.

The silica particles preferably have sphericity of 0.5 or more. When the sphericity of the silica particles is less than 0.5, the plugging material has high viscosity, exhibiting low fluidity when filled in predetermined flow paths, and thus likely resulting in uneven plug length. The sphericity of the silica particles is further preferably 0.6 or more, and more preferably 0.7 or more. The sphericity of each silica particle is determined by dividing a projected area of the silica particle by the area of a circle having a diameter corresponding to the maximum length of a line segment connecting two points on a periphery of the silica particle, which passes through the center of gravity of the silica particle, and it can be determined by the image analysis of an electron photomicrograph.

The silica particles may contain $CaO$, $Na_2O$, $K_2O$, $Fe_2O_3$, etc. as impurities. To prevent the plugs from having too large a thermal expansion coefficient, the total amount of the above impurities is preferably 0.1% or less.

(ii) Cordierite Particles

The cordierite particles in the ceramic particles constituting the plugs preferably have a median particle diameter of 5-30 μm. When the median particle diameter is less than 5 μm, the plugging material largely shrinks when heated, likely resulting in uneven plug length. On the other hand, when the median particle diameter is more than 30 μm, the plugs obtained by heating the plugging material are likely to have low strength. The preferred lower and upper limits of the median particle diameter of the cordierite particles are 7 μm and 25 μm, respectively. The lower limit of D10 of the cordierite particles is preferably 0.5 μm, and more preferably 1 μm, and the upper limit is preferably 10 μm, and more preferably 7 μm. The lower limit of D90 is preferably 15 μm, and more preferably 20 μm, and the upper limit is preferably 50 μm, and more preferably 40 μm. Incidentally, D10<D50<D90.

The cordierite particles may contain $Na_2O$, $Fe_2O_3$, $K_2O$, $CaO$, $TiO_2$, etc. as impurities in a total amount of 3% or less by mass.

(2) Amorphous Oxide Matrix

The amorphous oxide matrix constituting the plugs is preferably formed by colloidal oxide such as colloidal silica, colloidal alumina, etc., because it has excellent bondability to amorphous silica particles and cordierite particles as well as to the cell walls, providing the plugs with high strength. Further, to provide the plugs with a desired thermal expansion coefficient, the colloidal metal oxide is more preferably colloidal silica.

The amount of the amorphous oxide matrix constituting the plugs in the ceramic honeycomb filter of the present invention is 5-25 parts by mass per 100 parts by mass of the ceramic particles. When the amount of the amorphous oxide matrix is less than 5 parts by mass per 100 parts by mass of the ceramic particles, the amorphous oxide matrix exhibits an insufficient bonding force to the ceramic particles, failing to provide the plugs with necessary strength. On the other hand, when the amount of the amorphous oxide matrix is more than 25 parts by mass, the plugs are occupied by too much an amorphous oxide matrix, resulting in a small percentage of ceramic particles as aggregates, providing the plugs with low strength. The lower limit of the amount of the amorphous oxide matrix is preferably 10 parts by mass, and the upper limit is preferably 20 parts by mass.

Though the plugs constituting the ceramic honeycomb filter of the present invention comprise the ceramic particles and the amorphous oxide matrix, materials forming the plugs are not limited thereto, but organics such as binders, ceramic fibers, cement, unsintered ceramic powder, etc. may be contained if necessary.

[2] Production Method of Ceramic Honeycomb Filter (1) Production of Ceramic Honeycomb Structure At least cordierite-forming material powder formulated to form cordierite by sintering, which has a composition comprising 48-52% by mass of $SiO_2$, 33-37% by mass of $Al_2O_3$, and 12-15% by mass of $MgO$, a pore-forming material, and an organic binder are mixed to prepare a starting material mixture. Kaolin, talc, silica, alumina, and aluminum hydroxide can be used for the cordierite-forming material. Kaolin and talc are preferably in a planar shape. It is preferable to use kaolin having a cleavage index of 0.80 or more, and talc having a morphology index of 0.5 or more.

The cleavage index of kaolin particles can be determined, as described in JP 2006-265034 A, by pressing a predetermined amount of kaolin particles into a container, measuring the X-ray diffraction of a pressed surface, and calculating the following formula:

Cleavage index=$I_{(002)}/[I_{(200)}+I_{(020)}+I_{(002)}]$, wherein $I_{(200)}$, $I_{(020)}$ and $I_{(002)}$ represent the peak intensities of a (200) plane, a (020) plane and a (002) plane.

The morphology index of talc can be determined, as described in U.S. Pat. No. 5,141,686, by measuring the X-ray diffraction of planar talc particles, and calculating the following formula:

Morphology index=$Ix/(Ix+2Iy)$, wherein Ix represents the diffraction intensity of a (004) plane, and Iy represents the diffraction intensity of a (020) plane.

Water, a lubricant, etc. are added to the starting material mixture, and kneaded to prepare a moldable material. The moldable material is extruded through a known extrusion die to a honeycomb shape preferably having an outer diameter of 150 mm or more, a wall thickness of 0.05-0.5 mm, and a cell density of 50-500 cells/square inch. The extruded ceramic honeycomb green body is dried in a hot-air furnace, a microwave drying apparatus, etc., sintered at the highest keeping temperature of 1380-1420° C., and then machined in the end surfaces by a diamond grinder to obtain a cordierite-type ceramic honeycomb structure 11 having a predetermined length. By sintering a green body obtained by extruding the cordierite-forming material powder using planar kaolin and talc to a honeycomb shape at a temperature of 1380-1420° C., it is possible to produce a ceramic honeycomb structure having cell walls whose thermal expansion coefficient Tw ($\times 10^{-7}/°$ C.) in the flow path direction is 10 or less between 40° C. and 800° C.

Figure 2A:
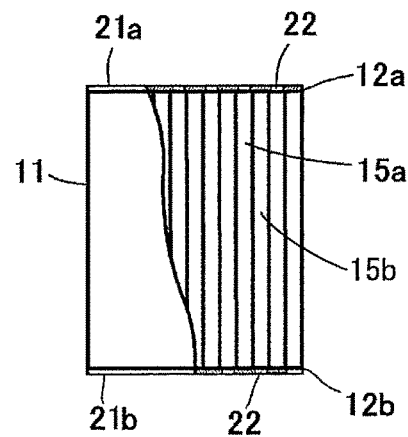
FIG. 2(*a*) is a schematic view showing a step of forming plugs of the ceramic honeycomb filter of the present invention.

(2) Formation of Plugs (i) Attaching of Plug-Forming Film and Formation of Holes A plugging material is alternately charged into the end surfaces 12a, 12b of predetermined flow paths 15a, 15b of the ceramic honeycomb structure 11, and dried to form plugs 13a, 13b in a checkerboard pattern. The charging steps of the plugging material are explained referring to FIGS. 2(a) to 2(c). A plug-forming film 21a is first attached to one end surface 12a of the ceramic honeycomb structure 11, and provided with holes 22 in a checkerboard pattern by a laser, etc. at positions corresponding to the flow paths 15a [FIG. 2(a)]. Likewise, a plug-forming film 21b is attached to another end surface 12b, and provided with holes 22 in a checkerboard pattern by a laser, etc. at positions corresponding to the flow paths 15b [FIG. 2(a)]. The holes 22 are arranged such that the flow paths 15b open on the end surface 12a and the flow paths 15a open on the end surface 12b are alternately positioned. The method of forming the holes 22 is not restricted, as long as the plug-forming film can be provided with openings. For example, a method of pushing a metal rod having a sharp tip end or a heated metal rod to the film may be used.

(ii) Preparation of Plugging Material

The plugging material 23 is prepared as follows. First, amorphous silica particles comprising 4-30% by mass of first silica particles having a median particle diameter of 10-40 μm and 70-96% by mass of second silica particles having a median particle diameter of 70-200 μm are prepared in a total amount of 100% by mass. The first and second silica particles are preferably spherical particles having sphericity of 0.5 or more. The spherical particles are preferably produced by melting silica stone in a high-temperature flame for spheroidization by surface tension. Next, 100 parts by mass of ceramic particles comprising 42-90% by mass of the above amorphous silica particles and 10-58% by mass of cordierite particles are dry-mixed with 0.5-5.0 parts by mass of a binder such as methylcellulose, etc., and if necessary, ceramic fibers, cement, unsintered ceramic powder, etc. 5-25 parts by mass on a solid basis of colloidal oxide (colloidal silica, colloidal alumina, etc.) is added to 100 parts by mass of the ceramic particles, and wet-mixed and blended with 20-40 parts by mass of water to obtain the plugging material 23. The amount X (% by mass) of amorphous silica particles in the ceramic particles and the thermal expansion coefficient Tw ($\times 10^{-7}/°$ C.) of the cell walls of the honeycomb structure between 40° C. and 800° C. preferably meet the formula (1):

$$(118.33-8.1367 \times Tw) \leq X \leq (150.88-8.1367 \times Tw).$$

The cordierite particles are obtained, for example, by molding the cordierite-forming powder formulated to form cordierite by sintering to a block-shaped green body, which is sintered in a furnace whose highest temperature is adjusted in a cordierite-forming temperature range, for example, 1350-1450° C., for about 20 hours, and dry-pulverizing the resultant sintered block by a ball mill, etc.

The colloidal oxide is a colloidal substance, in which nano-sized particles are dispersed in a dispersion medium such as water, etc. The colloidal oxide acts to bind amorphous silica particles and cordierite particles constituting the plugs, and bond the plugs to the cell walls. Also, the addition of the colloidal oxide increases the fluidity of the plugging material 23, so that the plugging material 23 charged into the flow paths 15b through holes 22 formed in the plug-forming film 21a attached to the end surface 12a of the ceramic honeycomb structure 11 can easily enter to a predetermined depth as described below. The use of colloidal silica, colloidal alumina, etc. as the colloidal oxide is preferable to further improve the fluidity of the plugging material 23, because the plugging material 23 charged into the flow paths 15b through holes 22 formed in the plug-forming film 21a attached to the end surface 12a of the ceramic honeycomb structure 11 can more easily enter to a predetermined depth as described below. Particularly, it is more preferable to use colloidal silica, because it makes it easy to provide the plugs with a desired thermal expansion coefficient. The solid fraction of the colloidal oxide is preferably 20-40% by mass.

(iii) Charging of Plugging Material into One End Surface

Figure 2B:
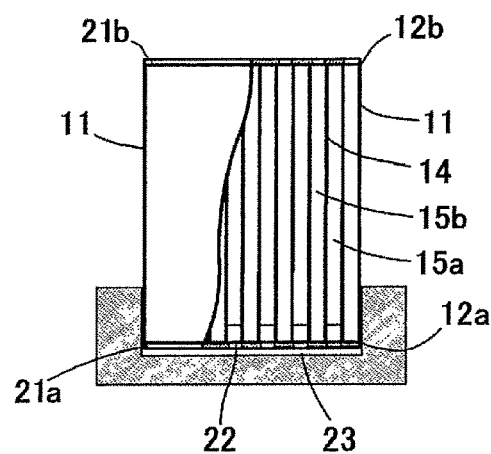

One end surface 12a of the ceramic honeycomb structure 11 is then immersed in the blended plugging material 23 to let the plugging material 23 enter the flow paths 15a to a predetermined depth through the holes 22 of the plug-forming film 21a attached to the end surface 12a [FIG. 2(b)].

(iv) Drying of Plugging Material

The plugging material 23 charged into the flow paths 15b on the side of one end surface 12a is dried to remove water from the plugging material 23 and the dispersion medium from the colloidal oxide, thereby binding ceramic particles and bonding the plugs 13a to the cell walls. The plugging material 23 can be dried by a hot-air furnace, microwave heating, high-frequency induction heating, etc. Among them, the high-frequency induction heating is preferable.

(v) Charging of Plugging Material into Another End Surface

The plugging material 23 is similarly charged into another end surface 12b of the ceramic honeycomb structure 11, so that the plugging material 23 enters the flow paths 15b to a predetermined depth.

(iv) Drying of Plugging Material

Figure 2C:
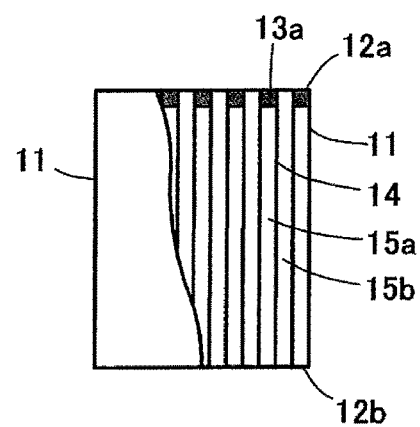

The plugging material 23 charged into another end surface 12b is similarly dried to form plugs 13b, thereby obtaining a ceramic honeycomb filter 10 having flow paths 15a, 15b alternately sealed by the plugs 13a, 13b on one end surface 12a and another end surface 12b [FIG. 2(c)].

In the ceramic honeycomb structure of the ceramic honeycomb filter produced by the above method, the thermal expansion coefficient of the cell walls in the flow path direction and the thermal expansion coefficient of the plugs can meet a proper relation. The cell walls of the ceramic honeycomb filter have a thermal expansion coefficient Tw ($\times 10^{-7}/°$ C.) of 10 or less in the flow path direction between 40° C. and 800° C. The plugs comprise at least ceramic particles, and 5-25 parts by mass of an amorphous oxide matrix per 100 parts by mass of the ceramic particles, the ceramic particles comprising at least 42-90% by mass of amorphous silica particles and 10-58% by mass of cordierite particles, and the amorphous silica particles comprising 4-30% by mass of first silica particles having a median particle diameter of 10-40 μm and 70-96% by mass of second silica particles having a median particle diameter of 70-200 μm.

EXAMPLES

The present invention will be explained in further detail by Examples, without intention of restricting the present invention thereto.

Examples 1-9

6.0 parts by mass of kaolin powder (median particle diameter: 4.2 μm, and cleavage index: 0.92), 41.2 parts by mass of talc powder (median particle diameter: 11.8 µm, D10: 5.4 µm, D90: 35.3 µm, and morphology index 0.59), 18.1 parts by mass of silica powder (median particle diameter: 25.7 µm, D10: 15.3 µm, D20: 18.2 µm, D80: 38.7 µm, D90: and 49.2 µm), 23.3 parts by mass of alumina powder (median particle diameter: 4.9 µm, D90: 9.7 µm, and percentage of 25 µm or more: 0.01%, and 11.3 parts by mass of aluminum hydroxide powder (median particle diameter: 8.9 µm) were mixed to prepare a cordierite-forming material powder, to which 5.5 parts by mass of methylcellulose and hydroxypropyl methylcellulose as a binder, and 5.5 parts by mass of a foamed resin (average particle diameter: 41.5 µm) as a pore-forming material were added. After sufficient dry mixing, 25 parts by mass of water was added, and sufficient blending was conducted to prepare a plasticized moldable ceramic material. The moldable material was extruded from an extrusion die, and cut to a green body of 270 mm in diameter and 300 mm in length. The green body was dried, and sintered at the highest keeping temperature of 1400° C. to obtain a cordierite-type ceramic honeycomb structure 11, whose cell walls had a thickness of 0.3 mm, a cell pitch of 1.5 mm, porosity of 58%, an average pore diameter of 13 µm, a pore diameter distribution in which d5=54.4 µm, d10=25.9 µm, d85=7.9 µm, d90=5.1 µm, and d98=1.4 jam, and a thermal expansion coefficient of $9.2 \times 10^{-7}/°$ C. in the flow path direction between 40° C. and 800° C.

Plugs were formed in the ceramic honeycomb structure 11 as follows. The end surfaces 12a, 12b of the ceramic honeycomb structure 11 were ground, and a resin film 21a having a thickness of 0.09 mm was attached as a plug-forming film to each end surface. The film was provided with holes 22 in a checkerboard pattern at positions at which the flow paths were to be plugged, by a laser beam [FIG. 2(a)].

Tables 1-3 show ceramic particles and colloidal oxide, which were plugging materials forming the plugs of the ceramic honeycomb filters of Examples. These plugging materials, an organic binder (methylcellulose) and water were mixed with the formulation shown in Table 4, to prepare the plugging materials of Examples 1-9 by the following procedure.

First, the amorphous silica particles shown in Table 1 and the cordierite particles shown in Table 2 were dry-mixed with methylcellulose. After dry mixing, the colloidal silica shown in Table 3 and ion-exchanged water were added to conduct blending for 30 minutes in a vacuum blending mixer, to prepare plugging material slurries. The particle size distribution and median particle diameter of the ceramic particles used were measured by a Microtrack particle size distribution meter (MT3000 available from Nikkiso Co., Ltd.).

The ceramic honeycomb structure 11 on the side of the end surface 12a was then immersed in the plugging material 23, to let the plugging material 23 enter the flow paths 15a to the depth of 10 mm through the holes 22 formed in the film 21a [FIG. 2(b)]. The end surface 12a, on which the plugging material 23 was charged, was heated by high-frequency induction (output: 7 kW) for 30 seconds to dry the plugging material 23, and the film 21a was then peeled from the end surface 12a. The honeycomb structure 11 on the side of another end surface 12b was similarly immersed in the plugging material 23, to let the plugging material 23 enter the flow paths 15b to the depth of 10 mm through the holes 22 formed in the film 21b. The end surface 12b, on which the plugging material 23 was charged, was then heated by high-frequency induction (power: 7 kW) for 30 seconds to dry the plugging material 23, and the film 21b was then peeled from the end surface 12b to obtain the ceramic honeycomb filters of Examples 1-9.

Figure 4:
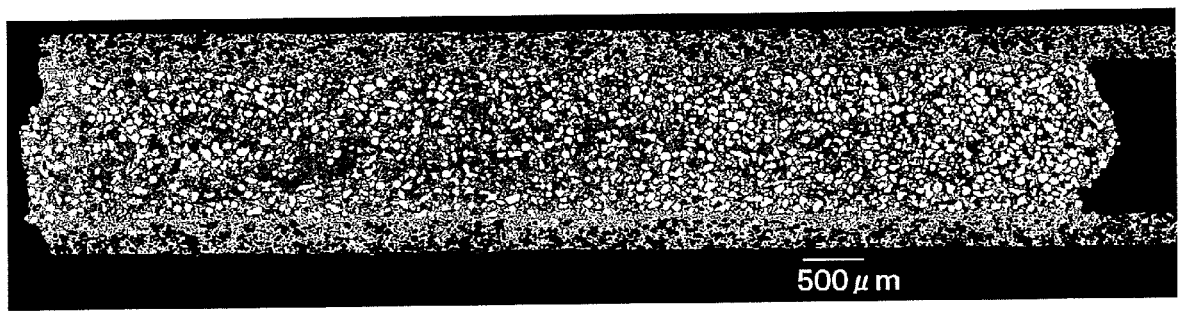
FIG. 4 is a scanning electron photomicrograph showing a cross section of a plug in the ceramic honeycomb filter produced in Example 1.

The scanning electron photomicrograph of a cross section of a plug in the ceramic honeycomb filter of Example 1 is shown in FIG. 4. The plugs comprising amorphous silica particles and cordierite particles bound by an amorphous oxide matrix were fixed to the cell walls in end portions of the flow paths of the ceramic honeycomb structure.

Example 10

6.0 parts by mass of kaolin powder (median particle diameter: 4.2 µm, and cleavage index: 0.92), 41.2 parts by mass of talc powder (median particle diameter: 10.9 µm, D10: 3.5 µm, D90: 31.2 µm, and morphology index 0.59), 18.1 parts by mass of silica powder (median particle diameter: 21.1 µm, D10: 11.1 µm, D20: 14.2 µm, D80: 34.3 µm, and D90: 45.4 µm), 22.8 parts by mass of alumina powder (median particle diameter: 4.4 µm, D90: 8.5 µm, and percentage of 25 µm or more: 0.01%), and 11.3 parts by mass of aluminum hydroxide powder (median particle diameter: 8.9 µm) were mixed to prepare a cordierite-forming material powder, to which 5.5 parts by mass of methylcellulose and hydroxypropyl methylcellulose as a binder, and 5.5 parts by mass of a foamed resin (average particle diameter 38.8 µm) as a pore-forming material were added. After sufficient dry mixing, 25 parts by mass of water was added, and sufficient blending was conducted to prepare a plasticized moldable ceramic material. The moldable material was extruded from an extrusion die, and cut to a green body of 270 mm in diameter and 300 mm in length. The green body was dried, and sintered at the highest keeping temperature of 1400° C. to obtain a cordierite-type ceramic honeycomb structure 11, whose cell walls had a thickness of 0.3 mm, a cell pitch of 1.5 mm, porosity of 58%, an average pore diameter of 13 µm, a pore diameter distribution in which d5=46.9 µm, d10=23.7 µm, d85=7.4 µm, d90=4.7 µm, and d98=1.1 jam, and a thermal expansion coefficient of $7.0 \times 10^{-7}/°$ C. in the flow path direction between 40° C. and 800° C.

Plugs were formed in the ceramic honeycomb structure 11 in the same manner as in Example 1 except for using the plugging material of Example 10 shown in Table 4, to produce the ceramic honeycomb filter of Example 10.

Comparative Examples 1-3 and 5-10

The ceramic honeycomb filters of Comparative Examples 1-3 and 5-10 were produced in the same manner as in Example 1, except for using the plugging materials of Comparative Examples 1-3 and 5-10 shown in Table 4.

Comparative Example 4

6.0 parts by mass of kaolin powder (median particle diameter: 4.5 µm, and cleavage index: 0.95), 41.2 parts by mass of talc powder (median particle diameter: 14.0 µm, and morphology index 0.77), 18.2 parts by mass of silica powder (median particle diameter: 45 µm), 23.3 parts by mass of alumina powder (median particle diameter: 4.0 µm), and 11.3 parts by mass of aluminum hydroxide powder (median particle diameter: 1.8 µm) were mixed to prepare a cordierite-forming material powder, to which 5.5 parts by mass of methylcellulose and hydroxypropyl methylcellulose as a binder, and 8 parts by mass of a foamed resin (average particle diameter: 43.5 µm) as a pore-forming material were added. After sufficient dry mixing, 26 parts by mass of water was added, and sufficient blending was conducted to prepare a plasticized moldable ceramic material. The moldable material was extruded from an extrusion die, and cut to a green body of 270 mm in diameter and 300 mm in length. The green body was dried, and sintered at the highest keeping temperature of 1400° C. to obtain a cordierite-type ceramic honeycomb structure 11, whose cell walls had a thickness of 0.3 mm, a cell pitch of 1.5 mm, porosity of 61%, an average pore diameter of 26.5 µm, a pore diameter distribution in which d5=78.3 µm, d10=54.5 µm, d85=11.5 µm, d90=8.5 µm, and d98=2.0 µm, and a thermal expansion coefficient of $12.9 \times 10^{-7}$/° C. in the flow path direction between 40° C. and 800° C.

Plugs were formed in the ceramic honeycomb structure 11 in the same manner as in Example 1 to produce the ceramic honeycomb filter of Comparative Example 4.

With respect to the ceramic honeycomb filters of Examples 1-10 and Comparative Examples 1-10, the thermal expansion coefficients and thermal shock resistance of the cell walls and plugs, the bonding strength of the plugs to the cell walls, and the unevenness of plug length were evaluated as follows. The results are shown in Table 5.

(a) Thermal Expansion Coefficient of Cell Walls

The thermal expansion coefficient of the cell walls was determined as an average thermal expansion coefficient between 40° C. and 800° C., on a test piece having a cross section shape of 4.5 mm×4.5 mm×50 mm (length) cut out of the cell walls with its longitudinal direction substantially in alignment with the flow path direction, by heating it from room temperature to 800° C. at a temperature-elevating speed of 10° C./minute and measuring its longitudinal length increase under a constant load of 20 g by a thermomechanical analyzer TMA of a compression load/differential expansion type (ThermoPlus available from Rigaku Corp.).

(b) Thermal Expansion Coefficient of Plugs

The blended plugging material remaining after charged into end portions of the flow paths of the ceramic honeycomb structure was dried and sintered under the same conditions as for the ceramic honeycomb structure, and a test piece having a cross section of 4.5 mm×4.5 mm×50 mm (length) was cut out of the resultant sintered body, to measure the thermal expansion coefficient of the plugs by a thermomechanical analyzer in the same manner as for the cell walls.

(c) Thermal Shock Resistance

Figure 3:
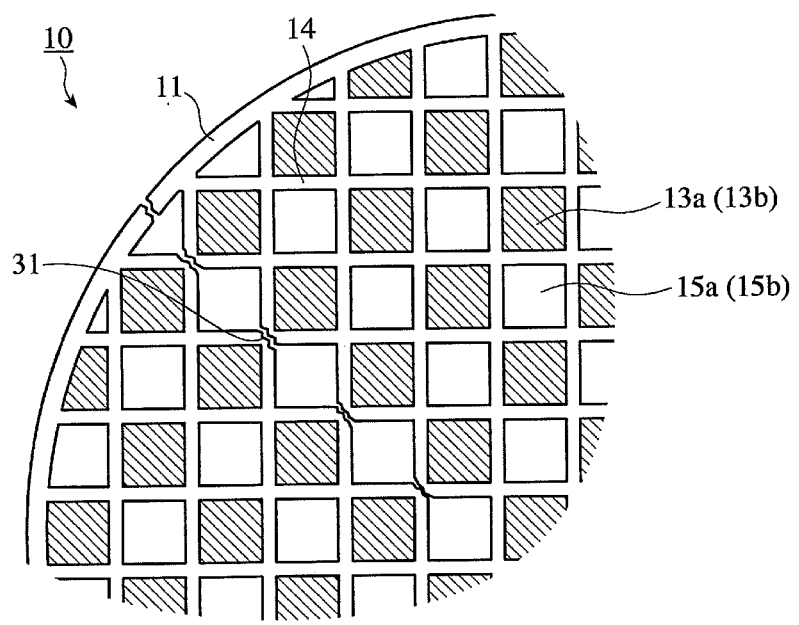
FIG. 3 is a front view showing cracks generated in the ceramic honeycomb filter by thermal shock.

The evaluation test of thermal shock resistance was conducted by heating the ceramic honeycomb filter at 500° C. for 30 minutes in an electric furnace, rapidly cooling it to room temperature, and then observing both end surfaces with the naked eye to examine whether or not cracks (see FIG. 3) were generated at cell wall interconnections between plugs. When cracks were not observed, the same test was conducted with the heating temperature elevated by 25° C. (second: 525° C., third: 550° C., . . . ), and this test was repeated until cracks were generated. The test was conducted on three samples, and the difference between a temperature at which cracks were generated in at least one honeycomb structure and room temperature (heating temperature−room temperature) was regarded as a thermal shock resistance temperature and evaluated by the following standard.

Excellent: The thermal shock resistance temperature was 575° C. or higher.
Good: The thermal shock resistance temperature was 550° C. or higher and lower than 575° C.
Fair: The thermal shock resistance temperature was 525° C. or higher and lower than 550° C.
Poor: The thermal shock resistance temperature was lower than 525° C.

(d) Bonding Strength of Plugs to Cell Walls

To evaluate the bonding strength of the plugs to the cell walls, a pushing rod of stainless steel having a flat tip end surface and a diameter of 0.8 mm was pressed to a plug from the end surface side on which the plug was formed, to measure a load at which the pushing rod broke the plug or detached the plug from the cell walls, and the load was divided by a cross section area (0.50 mm$^2$) of the pushing rod to determine plug strength (MPa), which was averaged for 10 plugs. The bonding strength was evaluated by the following standard.

Excellent: The plug strength was 40 MPa or more.
Good: The plug strength was 30 MPa or more and less than 40 MPa.
Poor: The plug strength was less than 30 MPa.

(e) Unevenness of Plug Length

The unevenness of plug length was evaluated by measuring the length of plugs formed in one ceramic honeycomb filter. The plug length was determined by inserting a stainless steel rod with a scale into a flow path from an end surface of the ceramic honeycomb structure having no plugs, measuring the length of the flow path when the rod came into contact with a plug on the opposite side (the length of an inserted portion of the stainless steel rod), and calculating its difference from the length of the ceramic honeycomb structure. With respect to one ceramic honeycomb filter, 17 flow paths were measured from each end surface (34 flow paths in total), to calculate the standard deviation of plug length. The unevenness of plug length was evaluated by the following standard.

Excellent: The standard deviation of plug length was less than 0.50.
Good: The standard deviation of plug length was 0.50 or more and less than 0.60.
Poor: The standard deviation of plug length was 0.60 or more.

TABLE 1

| Amorphous Silica Particles | D50[1] (µm) | D10 (µm) | D90 (µm) | Sphericity | CaO + Na$_2$O + K$_2$O + Fe$_2$O$_3$ (% by mass) |
|---|---|---|---|---|---|
| Silica A | 21 | 11 | 46 | 0.93 | 0.0014 |
| Silica B | 12 | 3 | 35 | 0.65 | 0.0014 |
| Silica C | 86 | 61 | 134 | 0.74 | 0.0016 |
| Silica D | 180 | 54 | 263 | 0.79 | 0.0016 |

Note:
[1]Median particle diameter.

TABLE 2

| Cordierite Particles | D50[1] (µm) | D10 (µm) | D90 (µm) | CaO (% by mass) | Na$_2$O (% by mass) | K$_2$O (% by mass) |
|---|---|---|---|---|---|---|
| Cordierite A | 11 | 3.1 | 31 | 0.91 | 0.18 | 0.28 |
| Cordierite B | 145 | 85 | 220 | 0.80 | 0.15 | 0.21 |

Note:
[1]Median particle diameter.

TABLE 3

| | Amount[1] | Percentage ((% by mass) | | | | |
|---|---|---|---|---|---|---|
| Colloidal Oxide | (% by mass) | $SiO_2$ | $Al_2O_3$ | MgO | $Na_2O$ | CaO |
| Colloidal Silica A | 40 | 99.4 | ≤0.1 | ≤0.1 | 0.4 | ≤0.1 |

Note:
[1] Amount on a solid basis.

TABLE 4

| | Ceramic Particles | | | | | |
|---|---|---|---|---|---|---|
| | Amorphous Silica Particles | | | | Cordierite Particles | |
| | Formulation | | | | | |
| | First Silica Particles | | Second Silica Particles | | X[1] | |
| No. | Type | % by mass | Type | % by mass | (parts by mass) | Type | Parts by Mass[2] |
| Example 1 | Silica A | 14.3 | Silica C | 85.7 | 70 | A | 30 |
| Example 2 | Silica A | 25.0 | Silica C | 75.0 | 70 | A | 30 |
| Example 3 | Silica A | 5.0 | Silica C | 95.0 | 70 | A | 30 |
| Example 4 | Silica A | 14.3 | Silica C | 85.7 | 45 | A | 55 |
| Example 5 | Silica A | 14.3 | Silica C | 85.7 | 75 | A | 25 |
| Example 6 | Silica A | 14.3 | Silica D | 85.7 | 70 | A | 30 |
| Example 7 | Silica B | 14.3 | Silica C | 85.7 | 70 | A | 30 |
| Example 8 | Silica A | 14.3 | Silica C | 85.7 | 49 | A | 51 |
| Example 9 | Silica A | 14.3 | Silica C | 85.7 | 66 | A | 34 |
| Example 10 | Silica A | 14.3 | Silica C | 85.7 | 74 | A | 26 |
| Com. Ex. 1 | — | 0 | — | 0 | 0 | A | 100 |
| Com. Ex. 2 | — | 0 | Silica C | 100.0 | 100 | — | 0 |
| Com. Ex. 3 | Silica A | 100.0 | — | 0 | 100 | — | 0 |
| Com. Ex. 4 | Silica A | 14.3 | Silica C | 85.7 | 70 | A | 30 |
| Com. Ex. 5 | Silica A | 14.3 | silica C | 85.7 | 40 | A | 60 |
| Com. Ex. 6 | Silica A | 100.0 | — | 0 | 40 | A | 60 |
| Com. Ex. 7 | — | 0 | Silica C | 100.0 | 40 | A | 60 |
| Com. Ex. 8 | Silica A | 3.0 | Silica C | 97.0 | 70 | A | 30 |
| Com. Ex. 9 | Silica A | 31.0 | Silica C | 69.0 | 70 | A | 30 |
| Com. Ex. 10 | — | 0 | — | 0 | 0 | A + B | 100[3] |

| | Colloidal Oxide | | Binder (Methylcellulose) | Ion-Exchanged Water |
|---|---|---|---|---|
| No. | Type | Parts by Mass[4] | Parts by Mass[5] | Parts by Mass[5] |
| Example 1 | Colloidal Silica A | 15 | 2.5 | 31 |
| Example 2 | Colloidal Silica A | 15 | 2.5 | 31 |
| Example 3 | Colloidal Silica A | 15 | 2.5 | 31 |
| Example 4 | Colloidal Silica A | 15 | 2.5 | 31 |
| Example 5 | Colloidal Silica A | 15 | 2.5 | 31 |
| Example 6 | Colloidal Silica A | 15 | 2.5 | 31 |
| Example 7 | Colloidal Silica A | 15 | 2.5 | 31 |
| Example 8 | Colloidal Silica A | 15 | 2.5 | 31 |
| Example 9 | Colloidal Silica A | 15 | 2.5 | 31 |
| Example 10 | Colloidal Silica A | 15 | 2.5 | 31 |
| Com. Ex. 1 | Colloidal Silica A | 15 | 2.5 | 31 |
| Com. Ex. 2 | Colloidal Silica A | 15 | 2.5 | 31 |
| Com. Ex. 3 | Colloidal Silica A | 15 | 2.5 | 31 |
| Com. Ex. 4 | Colloidal Silica A | 15 | 2.5 | 31 |
| Com. Ex. 5 | Colloidal Silica A | 15 | 2.5 | 31 |
| Com. Ex. 6 | Colloidal Silica A | 15 | 2.5 | 31 |
| Com. Ex. 7 | Colloidal Silica A | 15 | 2.5 | 31 |
| Com. Ex. 8 | Colloidal Silica A | 15 | 2.5 | 31 |
| Com. Ex. 9 | Colloidal Silica A | 15 | 2.5 | 31 |
| Com. Ex. 10 | Colloidal Silica A | 15 | 2.5 | 31 |

Note:
[1] The amount of amorphous silica particles in the ceramic particles (amorphous silica particles + cordierite particles).
[2] The amount of cordierite particles in the ceramic particles (amorphous silica particles + cordierite particles).
[3] A mixture of 60 parts by mass of cordierite particles A and 40 parts by mass of cordierite particles B.

Note:
[4] The amount of colloidal oxide on a solid basis per 100 parts by mass of ceramic particles (amorphous silica particles + cordierite particles).
[5] Amount per 100 parts by mass of ceramic particles (amorphous silica particles + cordierite particles).

TABLE 5

| | Thermal Expansion Coefficient (40-800° C.) | | Evaluation Results | | |
|---|---|---|---|---|---|
| No. | Cell Walls Tw ($\times 10^{-7}$/° C.) | Plugs Tp ($\times 10^{-7}$/° C.) | Thermal Shock Resistance | Plug Strength | Unevenness of Plug Length |
| Example 1 | 9.2 | 8 | Good | Excellent | Excellent |
| Example 2 | 9.2 | 8 | Good | Excellent | Good |
| Example 3 | 9.2 | 8 | Good | Good | Excellent |
| Example 4 | 9.2 | 11 | Fair | Excellent | Excellent |
| Example 5 | 9.2 | 7.1 | Fair | Excellent | Excellent |
| Example 6 | 9.2 | 8 | Good | Good | Excellent |
| Example 7 | 9.2 | 8 | Good | Excellent | Good |
| Example 8 | 9.2 | 10.5 | Good | Excellent | Excellent |
| Example 9 | 9.2 | 8.4 | Excellent | Excellent | Excellent |
| Example 10 | 7 | 7.7 | Excellent | Excellent | Excellent |
| Com. Ex. 1 | 9.2 | 16.5 | Poor | Excellent | Poor |
| Com. Ex. 2 | 9.2 | 4.1 | Poor | Poor | Poor |
| Com. Ex. 3 | 9.2 | 4.1 | Poor | Excellent | Poor |
| Com. Ex. 4 | 12.9 | 8 | Poor | Excellent | Excellent |
| Com. Ex. 5 | 9.2 | 11.6 | Poor | Excellent | Excellent |
| Com. Ex. 6 | 9.2 | 11.6 | Poor | Excellent | Poor |
| Com. Ex. 7 | 9.2 | 11.6 | Poor | Good | Poor |
| Com. Ex. 8 | 9.2 | 7.5 | Good | Excellent | Poor |
| Com. Ex. 9 | 9.2 | 7.5 | Good | Excellent | Poor |
| Com. Ex. 10 | 9.2 | 13.3 | Poor | Excellent | Poor |

It is clear from Table 4 that the ceramic honeycomb filters of Examples 1-10 of the present invention have enough bonding strength of plugs to cell walls and uniform plug length while keeping thermal shock resistance. On the other hand, any of the ceramic honeycomb filters of Comparative Examples 1-10 did not meet all of the requirements of thermal shock resistance, bonding strength between plugs and cell walls, and uniformity of plug length.

What is claimed is:

1. A ceramic honeycomb filter comprising a cordierite-type ceramic honeycomb structure having large numbers of flow paths partitioned by porous cell walls, and plugs formed in end portions of predetermined flow paths of said ceramic honeycomb structure;
said porous cell walls having a thermal expansion coefficient Tw of $10 \times 10^{-7}$/° C. or less in a flow path direction between 40° C. and 800° C.;
said plugs comprising at least ceramic particles, and 5-25 parts by mass of an amorphous oxide matrix per 100 parts by mass of said ceramic particles;
said ceramic particles comprising at least 42-90% by mass of amorphous silica particles and 10-58% by mass of cordierite particles, based on a total mass of said ceramic particles; and
said amorphous silica particles comprising 4-30% by mass of first silica particles having a median particle diameter of 10-40 μm and 70-96% by mass of second silica particles having a median particle diameter of 70-200 μm, based on a total mass of said amorphous silica particles.

2. The ceramic honeycomb filter according to claim 1, wherein an amount of said amorphous silica particles in said ceramic particles is 45 parts by mass or more and 75 parts by mass or less based on 100 parts by mass of said ceramic particles.

3. The ceramic honeycomb filter according to claim 1, wherein said cordierite particles have a median particle diameter of 5-30 μm.

4. The ceramic honeycomb filter according to claim 1, wherein said amorphous silica particles comprise 5-25% by mass of said first silica particles and 75-95% by mass of said second silica particles, based on the total mass of said amorphous silica particles.

5. The ceramic honeycomb filter according to claim 1, wherein said amorphous oxide matrix is silica.

\* \* \* \* \*